United States Patent [19]

Wesson

[11] 4,392,348
[45] Jul. 12, 1983

[54] DEVICE FOR BLEEDING MOTOR GASES THRU MOTOR POLE PIECE

[75] Inventor: Jerry J. Wesson, Winter Park, Fla.

[73] Assignee: The United States of America as represented by the Secretary of the Army, Washington, D.C.

[21] Appl. No.: 290,138

[22] Filed: Aug. 5, 1981

[51] Int. Cl.³ .............................................. F02K 9/80
[52] U.S. Cl. ........................................ 60/229; 60/271
[58] Field of Search .............. 60/229, 271; 239/271.1, 239/271.3, 265.11, 265.17, 265.25, 265.29, 265.31

[56] References Cited

U.S. PATENT DOCUMENTS

| | | | |
|---|---|---|---|
| 3,093,963 | 6/1963 | York et al. | 60/35.6 |
| 3,132,478 | 5/1964 | Thielman | 60/229 |
| 3,139,725 | 7/1964 | Raggio | 60/35.54 |
| 3,177,655 | 4/1965 | White | 60/36.6 |
| 3,197,959 | 8/1965 | Keller | 239/265.25 |
| 3,216,357 | 11/1965 | Mertens | 102/49 |
| 3,819,117 | 6/1974 | Moorhead | 239/265.23 |

Primary Examiner—L. J. Casaregola
Attorney, Agent, or Firm—William G. Gapcynski; Arthur I. Spechler; James T. Deaton

[57] ABSTRACT

A device for bleeding motor gases through the motor pole piece or flange and the rocket nozzle flange to reduce the control system weight and complexity and especially for fiber glass wound rocket motor cases.

6 Claims, 5 Drawing Figures

DEVICE FOR BLEEDING MOTOR GASES THRU MOTOR POLE PIECE

DEDICATORY CLAUSE

The invention described herein may be manufactured, used, and licensed by or for the Government for governmental purposes without the payment to me of any royalties thereon.

BACKGROUND OF THE INVENTION

In the past, rocket motors and nozzles have had an innerconnecting interface with several motor and pipe innerconnections with the pipes innerconnected into the motor case and being utilized as a means of obtaining pressure from the motor to be used as thrust vector control for the rocket. In these previous devices, it can be clearly seen that there is some difficulty involved in having a multiplicity of interfaces between the motor and the pipes connecting into the side of the motor in addition to the motor and nozzle interface. Further, there is great difficulty in fabricating or making a fiber rocket motor case with the pipes for the thrust vector control in the side of the rocket motor. That is, it is very difficult to wrap around a pipe when making a fiber motor case or to cut the necessary hole through the case after wrapping and make a secure pipe and motor connection that is required.

Therefore, it can be clearly seen that there is a great need for a simple device that lends itself readily to fiber motor case construction and a device which will provide the necessary piping innerconnecting means for thrust vector control.

Therefore, it is an object of this invention to provide a rocket motor case that has a motor flange interface at the exhaust end thereof for mating with a nozzle flange of the rocket nozzle for the motor and having passages through the motor flange which innerconnect with passages in the flange of the rocket nozzle to provide passage means for innerconnecting thrust vector control devices.

Another object of this invention is to provide a rocket motor that has a structure that can be readily fabricated by wrapping of the motor case from fiber glass materials.

Still another object of this invention is to provide a device that reduces control system weight and complexity.

Yet another object of this invention is to provide a device in which a chamber can be provided between the motor flange interface and the rocket nozzle flange interface to allow the outlet duct from the rocket nozzle to be larger than individual openings in the rocket motor flange that communicate to the motor flange interface.

Other objects and advantages of this invention will be obvious to those skilled in this art.

SUMMARY OF THE INVENTION

In accordance with this invention, a rocket motor is provided that can be readily wound from fiber glass material and has a motor flange at one end with an interface and a plurality of ports opening from the rocket motor case to the motor flange interface and a rocket nozzle that has a flange interface that mates with the rocket motor flange interface and is clamped thereto and has a plurality of ports therein that communicate with the ports of the rocket motor flange to provide fluid connections for thrust vector control devices.

DESCRIPTION OF THE PREFERRED EMBODIMENT

Figure 1:
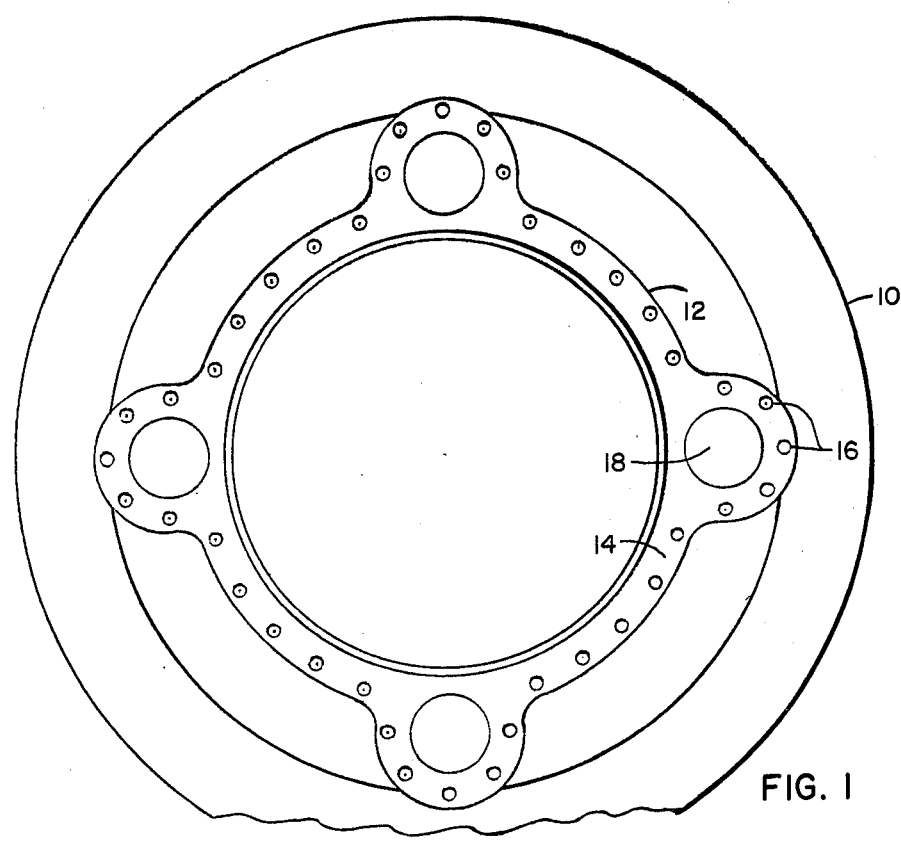
FIG. 1 is an end view of a rocket motor with an end flange that contains ports for thrust vector control in accordance with this invention.
Figure 2:
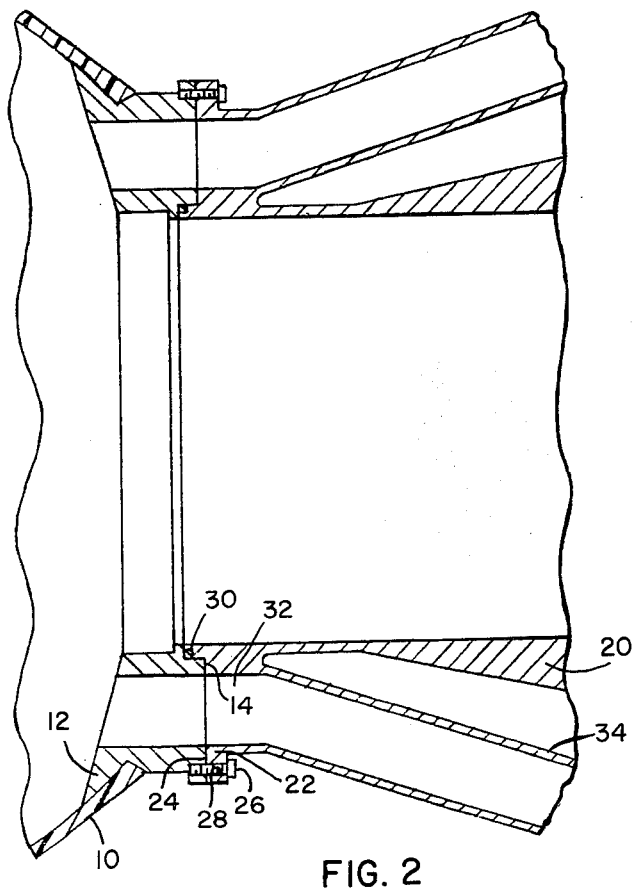
FIG. 2 is a sectional view illustrating the innerconnection of the rocket motor flange with the nozzle and its flange showing the innerconnection of one of the ports in the rocket motor flange with the port in the rocket nozzle in accordance with this invention.

Referring now to the drawing, FIGS. 1 and 2 show one embodiment of the invention which includes a rocket motor case 10 with an end motor flange 12 made integral with motor case 10. Motor flange 12 has a flat end surface 14 and openings 16 for securing a rocket exhaust nozzle thereto. Flange 12 has four openings or ports 18 that communicate from the interior of rocket motor 10 to flat end face 14. Rocket motor nozzle 20 includes a nozzle flange 22 with a flat end surface 24 for engagement with flat surface 14 of the rocket motor flange. A plurality of bolts securing means 26 engage openings 16 in flange 12 and are inserted through openings 28 in nozzle flange 22 for securing motor flange 12 and rocket nozzle flange 22 together in a sealing relationship in a conventional manner. Flanges 12 and 22 have inner telescoping surfaces with a seal 30 therebetween for sealing the two flanges. Rocket nozzle flange 22 also has a plurality of ports 32 that connect with ports 18 of the rocket motor flange and each of ports 32 has an integral duct 34 for connecting gases from the interior of rocket motor case 10 to thrust vector control means for the rocket.

Figure 3:
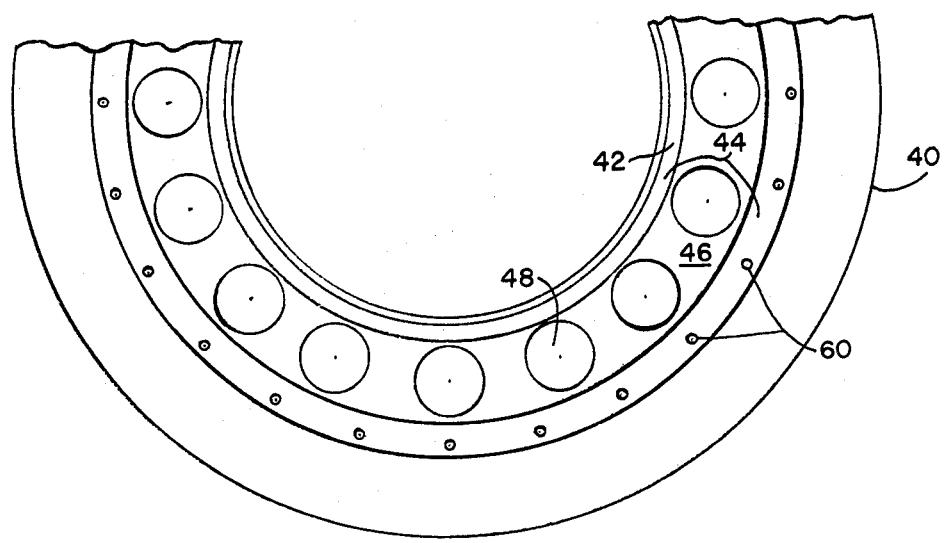
FIG. 3 is an end view of a rocket motor with an end flange having ports and a chamber in accordance with this invention.
Figure 4:
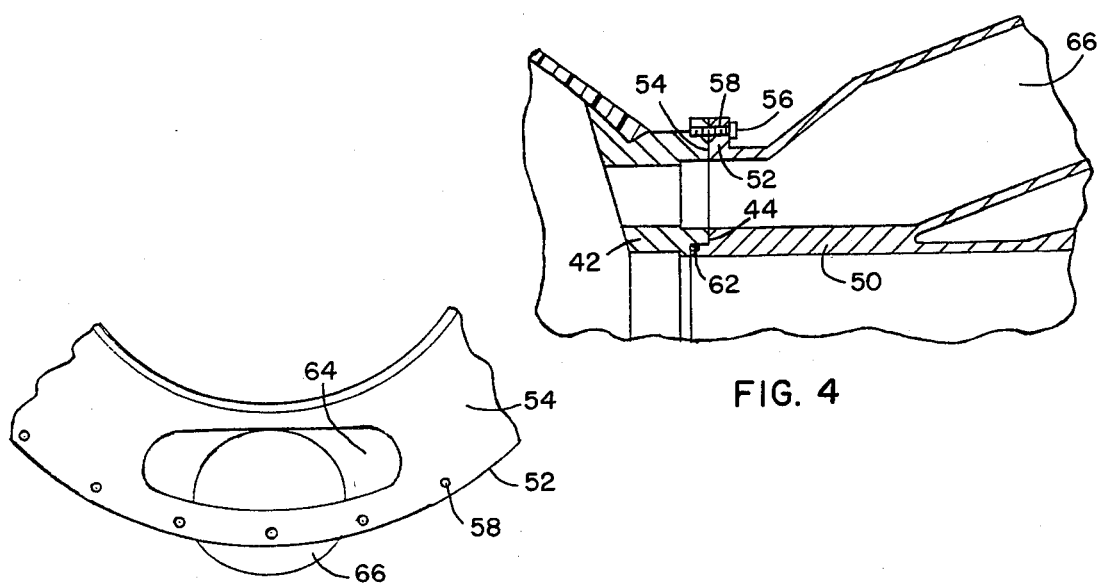
FIG. 4 is a sectional view showing the innerconnection of the motor flange and the rocket nozzle with its innerconnecting flange and passages with duct work in accordance with this invention.
Figure 5:
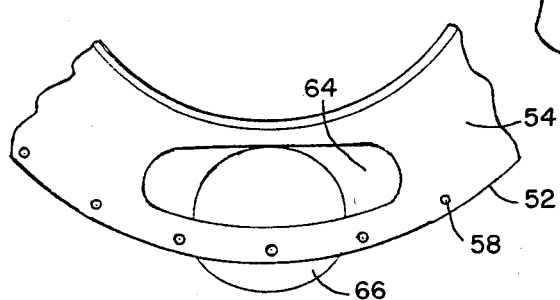
FIG. 5 is a view illustrating the shape of the port and passage to the duct work in accordance with this invention.

Referring now to FIGS. 3 thru 5, another embodiment of this invention is illustrated that includes a rocket motor case 40 that has an end motor flange 42 that is made integral with rocket motor case 40. End flange 42 has flat end surfaces 44 with a groove 46 therebetween with a multiplicity of port openings 48 opening through the flange from a chamber within the rocket motor case to groove 46. A rocket nozzle 50 has an end flange 52 with flat surface 54 that seals against flat surfaces 44 of motor flange 42 and is secured thereto in a conventional manner such as by bolts 56 mounted through openings 58 of flange 52 and into openings 60 of flange 42 in a conventional manner. Flange 52 has an inner portion which telescopes with an inner portion of flange 42 and a seal 62 seals between these telescoping portions. Also, flange 52 has a plurality of port openings 64 that are innerconnected to ducts 66. These openings 64 and ducts 66 have a large diameter in relation to the diameter of ports 48 in flange 42. Ducts 66 have a large diameter in order to accommodate large diameter thrust vector control valves used with this type device. The many small openings 48 in flange 42 have a total area of small ports 48 that is at least equal to the area of the large diameter ducts 66 and ports 64 that are utilized for directing gases to the thrust vector control valves. Also, groove 46 forms with the flat end surface 54 of flange 52 a chamber which allows the motor gases to flow freely from ports 48 to ports 64 and ducts 66 for the thrust vector control valves with large diameters.

In operation, in each of these embodiments, when combustion takes place in the rocket motor case, gases are produced that are normally exhausted through the exhaust nozzle and this pressure is communicated through the openings in the motor flange and nozzle flange to the thrust vector control valves for each of the systems to control the missile as desired. By having the openings for the thrust vector control system in the flange of the rocket motor and the connecting flange for the rocket nozzle, the overall structure is very much simplified and is readily adaptable to rocket motor cases that are fabricated from fiber glass such as by winding. Therefore, it can be seen that this invention overcomes problems of fabrication that have not been previously recognized or appreciated.

I claim:

1. A rocket motor case having a motor flange connected at one end of the rocket case and said flange having a flat surface means with a multiplicity of passages opening from the interior of said rocket motor case through said flat surface means, a rocket nozzle flange having a flat surface and means securing said rocket nozzle flange flat surface to said motor flange flat surface means, said rocket nozzle flange having a plurality of openings therein that extend from said flat surface outwardly to ducts, said openings in said rocket nozzle flange and said passages in said motor flange being in communication with each other.

2. A rocket motor as set forth in claim 1, wherein said motor flange has a circumferential groove at said flat surface means and said passages in said motor flange communicating through said groove with said openings of said rocket nozzle.

3. A rocket motor as set forth in claim 1, wherein said flat surface means of said motor flange and said flat surface on said flange of said rocket nozzle seal relative to each other and each of said passages in said motor flange communicate with one of the openings in said rocket nozzle flange.

4. A rocket motor as set forth in claim 3, wherein said motor flange and said rocket nozzle flange have telescoping inner surfaces with seal means therebetween.

5. A rocket motor case as set forth in claim 2, wherein said motor flange and said rocket nozzle flange have inner telescoping surfaces with sealing means sealing therebetween.

6. A rocket motor case as set forth in claim 1, wherein said motor case is a wound structure of fiber glass material.

* * * * *